UNITED STATES PATENT OFFICE.

VIKTOR GERBER, OF ZURICH, SWITZERLAND.

PROCESS OF PRODUCING NITRID OF ALUMINIUM FROM MATERIALS CONTAINING ALUMINIC OXID.

1,350,149. Specification of Letters Patent. Patented Aug. 17, 1920.

No Drawing. Application filed January 28, 1920. Serial No. 354,641.

*To all whom it may concern:*

Be it known that I, VIKTOR GERBER, a citizen of the Republic of Switzerland, residing at Zurich, Sihlquai 55, Switzerland, have invented certain new and useful Improvements in Processes of Producing Nitrid of Aluminium from Materials Containing Aluminic Oxid; and I do hereby declare the following to be a clear, full, and exact description of the invention, such as will enable others skilled in the art to which it appertains to make and use the same.

The attempts to find a suitable process of producing nitrid of aluminium on a large scale have not been successful up to the present, because the product has to be of such a purity that it can be converted into ammonia and into an alumina suitable for the manufacture of aluminium metal.

Most of the hitherto proposed processes have used as raw-material a bauxite which contains little silicic acid and have proposed to lead the same mixed with carbon into an atmosphere of nitrogen through a temperature zone of approximately 1800° centigrade. Said processes could not get, for technical reasons, a hold in the industry. Later on it has been proposed to produce first ferro-aluminium and to treat the latter with nitrogen. But the high amount of energy used and the impurity of the product gained in this manner are detrimental to that process.

The object of the present invention is to establish a process of producing nitrid of aluminium from materials containing alumina, the product of which answers the above mentioned requirements, and which process is not restricted to the use of bauxite, which contains little silicic acid, as the only aluminate. The new process consists in treating molten aluminic oxid produced from aluminates with a reducing agent and a nitrogenous gas and supplying at the same time the electric energy required for the reduction. This may be carried out in blowing the reducing agent, if it is solid, preferably in a finely distributed state, for example coal dust, together with a nitrogenous gas, for example nitrogen, into the liquid aluminic oxid or having it sucked through the molten mass. The solid reducing agent may further be introduced into the melt of aluminic oxid together with a mixture of a nitrogenous gas and a gaseous reducing agent.

In employing a liquid agent it is suitably introduced into the melt of aluminic oxid in the shape of steam. The process according to the invention may be carried out in an open or inclosed, resistance- or arc-furnace. An inclosed furnace can be worked at a pressure below atmospheric.

It is also possible to cause the molten aluminic oxid to flow in an atmosphere of nitrogen across carbon which has a large surface and which is kept at a high temperature by means of a supply of electric energy.

The molten aluminic oxid required in the process is produced in a known manner by melting in an electric furnace the aluminates themselves or together with carbon or together with carbon and iron of ferric oxid. In the melting process a separation takes place between the molten aluminic oxid and the greatest part of the other substances contained in the raw-material such as alkalis, silicic acid or silicon, etc. They volatilize or combine after the reduction with the iron, forming compounds with it, for instance ferro-silicon.

As raw-materials for producing alumina the following materials are chiefly of importance: impure alumina, corundum, bauxite, burnt alunite, aluminic silicates, for instance alumina and alkaline aluminic-silicates such as potash-felspar or potash-mica. In using red bauxite, pig iron may be obtained as valuable by-product and in using alunite and alkaline aluminic-silicates potash may be obtained. The pure molten aluminic oxid obtained from said materials is suitably not produced in the same electric furnace in which the process according to this invention is carried out.

I claim:

1. The process of producing nitrid of aluminium from materials containing aluminic oxid consisting in treating the molten aluminic oxid produced from said materials with a reducing agent and a nitrogenous gas and in supplying at the same time an amount of electric energy necessary for carrying out the reduction.

2. The process of producing nitrid of aluminium from materials containing aluminic oxid consisting in treating the molten aluminic oxid produced from said materials with carbon and a nitrogenous gas and in supplying at the same time electric energy.

3. The process of producing nitrid of aluminium from materials containing aluminic oxid consisting in treating the molten aluminic oxid produced from said materials with a reducing agent and nitrogen and in supplying at the same time electric energy.

4. The process of producing nitrid of aluminium from materials containing aluminic oxid consisting in treating the molten aluminic oxid produced from said materials with carbon and nitrogen and in supplying at the same time electric energy.

5. The process of producing nitrid of aluminium from materials containing aluminic oxid consisting in treating the molten aluminic oxid produced from said materials with a mixture of carbon and a reducing gas and a nitrogenous gas and in supplying at the same time electric energy.

6. A process of producing nitrid of aluminium from materials containing aluminic oxid consisting in treating the molten aluminic oxid produced from said materials with a mixture of carbon and a reducing gas and nitrogen and in supplying at the same time electric energy.

7. The process of producing nitrid of aluminium from materials containing aluminic oxid consisting in causing the molten aluminic oxid to flow across carbon heated up to a high temperature in an atmosphere of nitrogen and in maintaining the high temperature of the carbon in supplying it with electric energy.

In testimony that I claim the foregoing as my invention, I have signed my name.

VIKTOR GERBER.